(12) United States Patent
Okumura

(10) Patent No.: US 9,253,382 B2
(45) Date of Patent: Feb. 2, 2016

(54) ZOOM LENS AND IMAGE PICKUP APPARATUS

(71) Applicant: CANON KABUSHIKI KAISHA, Tokyo (JP)

(72) Inventor: Tetsuichirou Okumura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 49 days.

(21) Appl. No.: 14/086,361

(22) Filed: Nov. 21, 2013

(65) Prior Publication Data
US 2014/0146216 A1 May 29, 2014

(30) Foreign Application Priority Data
Nov. 28, 2012 (JP) .................. 2012-259491

(51) Int. Cl.
*G02B 27/64* (2006.01)
*G02B 15/14* (2006.01)
*H04N 5/225* (2006.01)
*G02B 15/173* (2006.01)

(52) U.S. Cl.
CPC .............. *H04N 5/2254* (2013.01); *G02B 15/14* (2013.01); *G02B 15/173* (2013.01); *G02B 27/64* (2013.01); *G02B 27/646* (2013.01)

(58) Field of Classification Search
CPC ............ G02B 9/00; G02B 9/60; G02B 13/00; G02B 13/001; G02B 13/0045; G02B 13/009; G02B 15/00; G02B 15/14; G02B 15/15; G02B 15/16; G02B 15/20; G02B 15/22; G02B 15/28; G02B 27/64; G02B 27/646
See application file for complete search history.

(56) References Cited

U.S. PATENT DOCUMENTS

| 5,042,927 | A | * | 8/1991 | Ogawa et al. ................. 359/683 |
| 5,241,421 | A | * | 8/1993 | Endo et al. .................... 359/684 |
| 6,061,180 | A | * | 5/2000 | Hayakawa .................... 359/557 |
| 6,061,186 | A | * | 5/2000 | Nishio .......................... 359/684 |
| 6,246,519 | B1 | * | 6/2001 | Suzuki .......................... 359/557 |
| 8,049,968 | B2 | | 11/2011 | Yamanaka et al. |
| 2011/0007403 | A1 | * | 1/2011 | Matsuo .......................... 359/684 |
| 2012/0026602 | A1 | | 2/2012 | Uchida et al. |

FOREIGN PATENT DOCUMENTS

| JP | 08-062541 | A | 3/1996 |
| JP | 08-136863 | A | 5/1996 |
| JP | 10-39215 | A | 2/1998 |
| JP | H10-133113 | A | 5/1998 |

(Continued)

*Primary Examiner* — Thong Nguyen
(74) *Attorney, Agent, or Firm* — Carter, DeLuca, Farrell & Schmidt, LLP

(57) ABSTRACT

The zoom lens includes, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. During zooming, the second lens unit is not moved and the first, third and fifth lens units are moved. A distance between the first and second lens units at a telephoto end is larger than that at a wide-angle end, a distance between the second and third lens units at the telephoto end is smaller than that at the wide-angle end. A condition of 0.7<f3/f4<1.5 is satisfied where f3 represents a focal length of the third lens unit, and f4 represents a focal length of the fourth lens unit.

10 Claims, 9 Drawing Sheets

(56) References Cited

FOREIGN PATENT DOCUMENTS

| | | |
|---|---|---|
| JP | H10-206736 A | 8/1998 |
| JP | 2003-344768 A | 12/2003 |
| JP | 2005-292338 A | 10/2005 |
| JP | 2007-192858 A | 8/2007 |
| JP | 2009-168934 A | 7/2009 |
| JP | 2010-113179 A | 5/2010 |
| JP | 2011-017912 A | 1/2011 |
| JP | 2011-215218 A | 10/2011 |
| JP | 2012-53444 A | 3/2012 |

* cited by examiner

ZOOM LENS AND IMAGE PICKUP APPARATUS

BACKGROUND OF THE INVENTION

1. Field of the Invention

The present invention relates to a zoom lens and an image pickup apparatus provided with the zoom lens, and particularly to an image pickup apparatus provided with a solid-state image sensor, such as a video camera, a digital still camera, a broadcasting camera and a monitoring camera.

2. Description of the Related Art

As an image capturing optical system used for image pickup apparatuses such as digital single-lens reflex cameras, a compact zoom lens is required which also has a high zoom ratio and a high optical performance in its entire zoom range and is capable of performing a high speed autofocus.

The digital single-lens reflex camera is desired to perform capturing of not only still images but also moving images, and it is necessary for autofocus in moving image capturing to repetitively perform focusing operations, each being performed in still image capturing.

In a focusing operation by a contrast detection method, an in-focus direction is detected by reciprocating a focus lens unit with a high speed in an optical axis direction, which is called "wobbling". After the wobbling, a signal component in a specific frequency band is detected from an output signal of an image sensor, an optimal, position of the focus lens unit at which an in-focus state is obtained is calculated, then the focus lens unit is moved to the optimal position, and thereby focusing is completed.

In order not to cause a use to have an odd feeling during the wobbling, it is necessary to drive the focus lens unit at a high speed if the focus lens unit has a heavy weight, an actuator such as a motor to drive the focus lens unit at a high speed become large in size, and a maximum diameter of a lens barrel increases, so that a lens apparatus including them becomes large in size.

Japanese Patent Laid-Open No. 10-39215, U.S. Pat. No. 8,049,968 and U.S. Patent Application Publication No. 2012/0026602 disclose zoom lenses each performing wobbling of a compact and lightweight lens unit disposed on the image side further than an aperture stop in focusing.

The zoom lenses disclosed in Japanese Patent Laid-Open No. 10-39215 and U.S. Pat. No. 8,049,968 each include, in order from the object side to the image side, first, second, third, fourth and fifth lens units having positive, negative, positive, positive and negative refractive powers; the fifth lens unit is moved during the focusing.

The zoom lens disclosed in U.S. Patent Application Publication No. 2012/0026602 includes, in the order from the object side to the image side, first, second, third, fourth, fifth and sixth lens units having positive, negative, positive, positive, negative and positive refractive powers; part of the fifth lens unit is moved during the focusing.

In order to achieve an entirely compact zoom lens having a high, zoom ratio and being capable of performing focusing at a high speed, it is important to appropriately set its zoom type, refractive powers of respective lens units included therein and its lens configuration.

SUMMARY OF THE INVENTION

The present invention provides a compact zoom lens having a high zoom ratio and a high optical performance and being capable of performing focusing at a high speed.

The present invention provides as one aspect thereof a zoom lens including, in order from an object side to an image side, a first lens unit having a positive refractive power, a second lens unit having a negative refractive power, a third lens unit having a positive refractive power, a fourth lens unit having a positive refractive power, and a fifth lens unit having negative refractive power. During zooming, the second lens unit is not moved and the first, third and fifth lens units are moved. A distance between the and second lens units at a telephoto end is larger than that at a wide-angle end, a distance between the second and third lens units at the telephoto end is smaller than that at the wide-angle end. The following condition is satisfied:

$$0.7 < f3/f4 < 1.5$$

where f3 represents a focal length of the third lens unit, and f4 represents a focal length of the fourth lens unit.

The present invention provides as another aspect thereof an image pickup apparatus including the above zoom lens, and a solid-state image sensor photoelectrically converting an optical image formed by the zoom lens.

Further features of the present invention will become apparent from the following description of exemplary embodiments (with reference to the attached drawings).

DESCRIPTION OF THE EMBODIMENTS

Exemplary embodiments of the present invention will hereinafter be described with reference to the accompanying drawings.

A zoom lens of each embodiment of the present invention includes, in order from an object side to an image side, a first lens unit having a positive refractive power, a second lens unit having a negative refractive power, a third lens unit having a positive refractive power, a fourth lens unit having a positive refractive power and a fifth lens unit having a negative refractive power. During zooming, the second lens unit is not moved, and the first lens unit, the third lens unit, the fourth lens unit and the fifth lens unit are moved. At a telephoto end, a distance between the first lens unit and the second lens unit is larger than that at a wide-angle end, and a distance between the second lens unit and the third lens unit is smaller than that at the wide-angle end.

Figure 1:
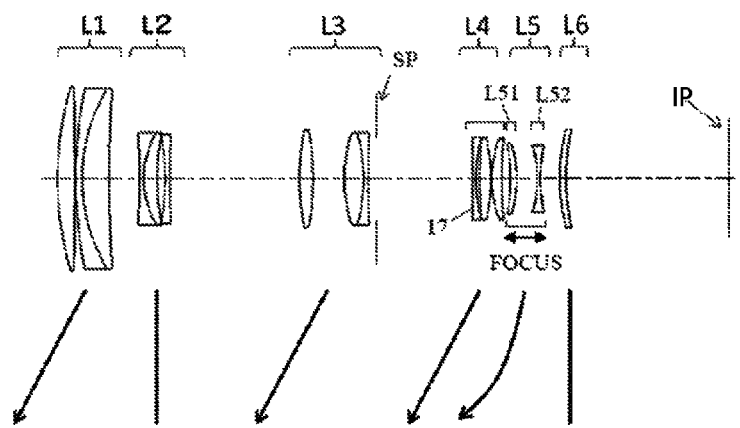
FIG. 1 is a sectional view illustrating a zoom lens that is Embodiment 1 of the present invention at a wide-angle end.
Figure 2A:
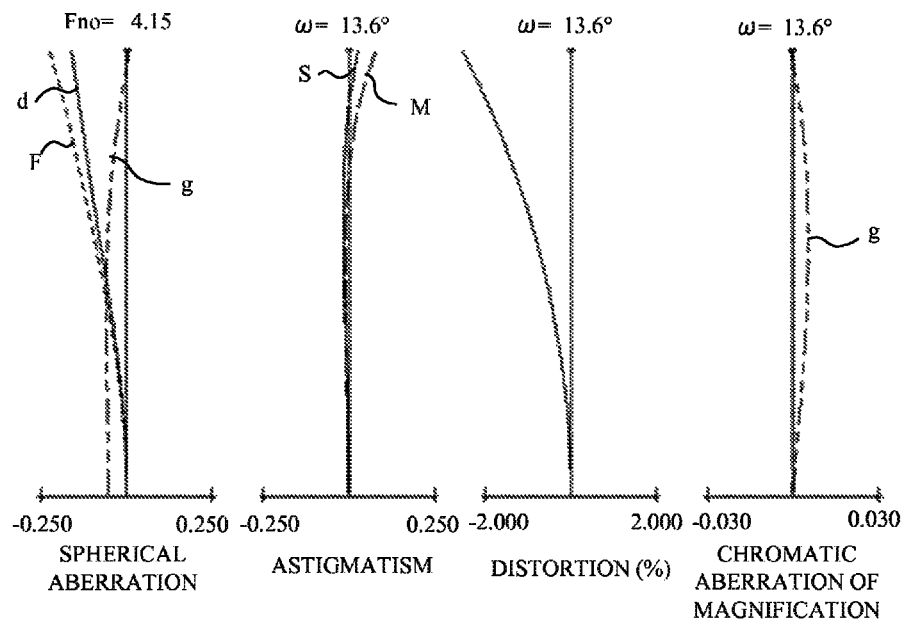
FIGS. 2A and 2B are aberration charts of the zoom lens of Embodiment 1 at the wide angle end and at a telephoto end.
Figure 2B:
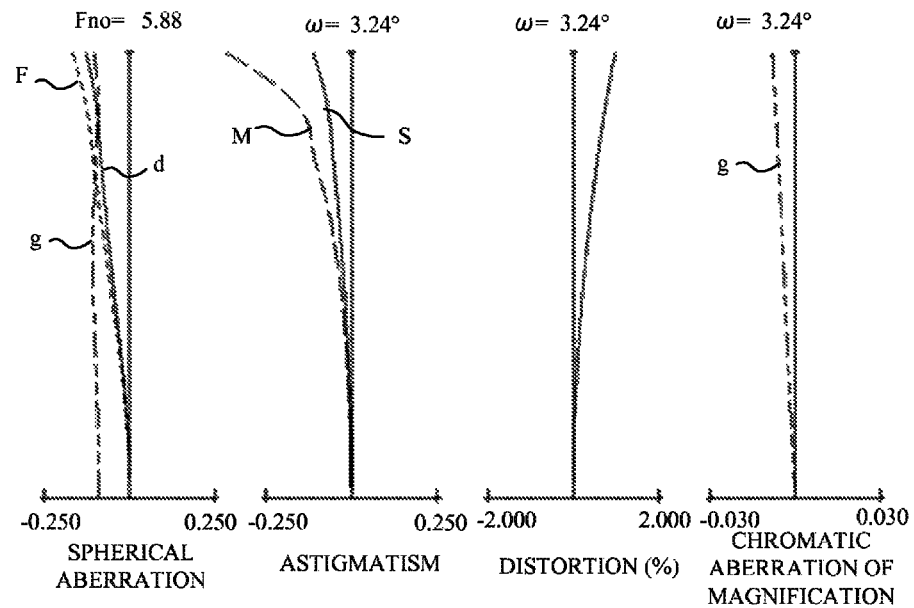
Figure 3:
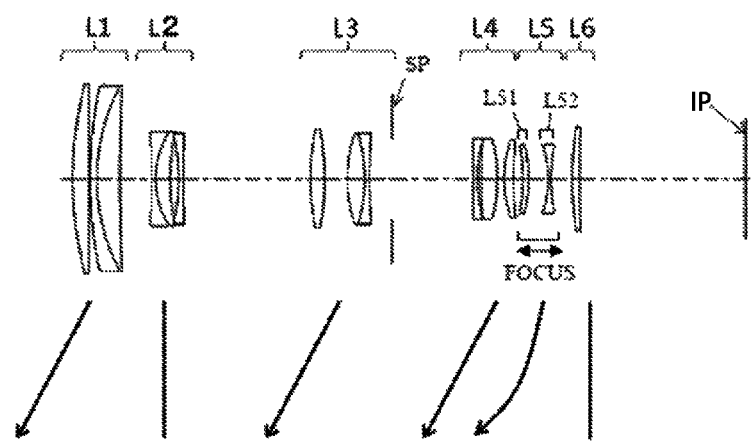
FIG. 3 is a sectional view illustrating a zoom lens that is Embodiment 2 of the present invention at a wide-angle end.
Figure 4A:
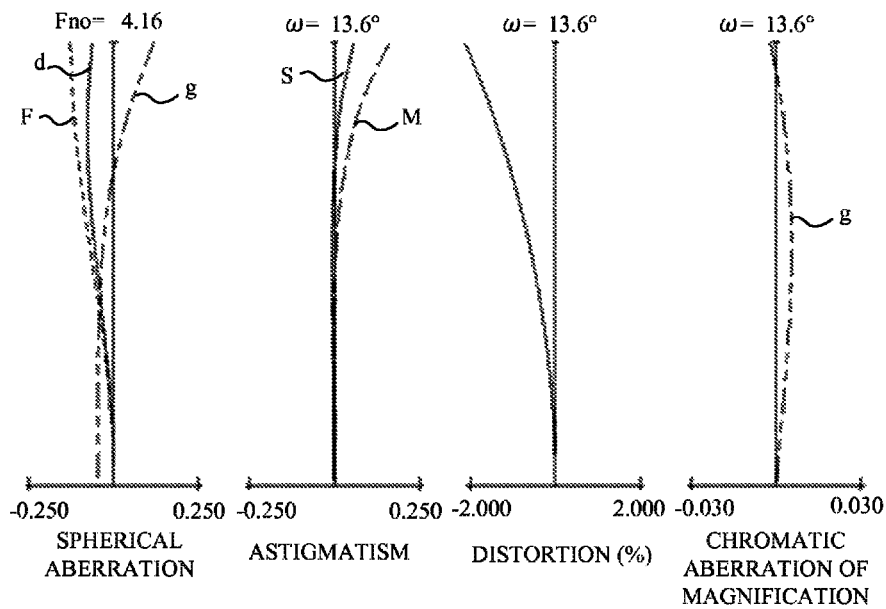
FIGS. 4A and 4B are aberration charts of the zoom lens of Embodiment 2 at the wide angle end and at a telephoto end.
Figure 4B:
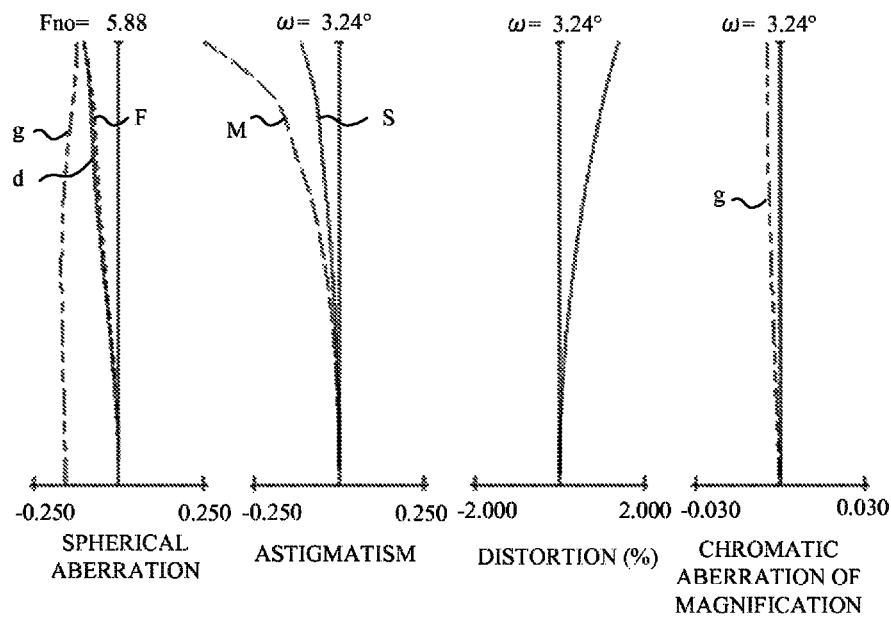
Figure 5:
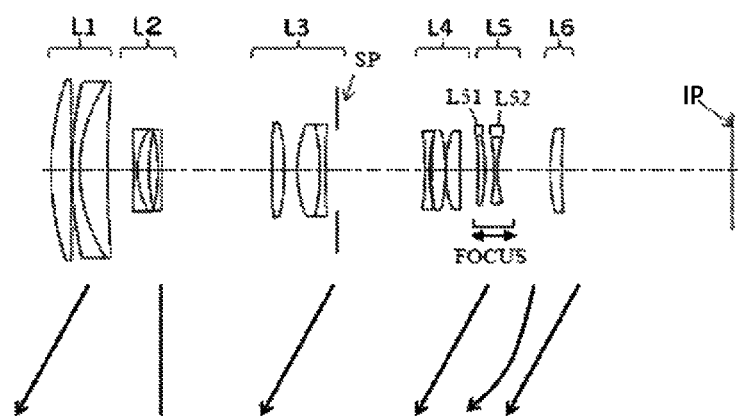
FIG. 5 is a sectional view illustrating a zoom lens that is Embodiment 3 of the present invention at a wide-angle end.
Figure 6A:
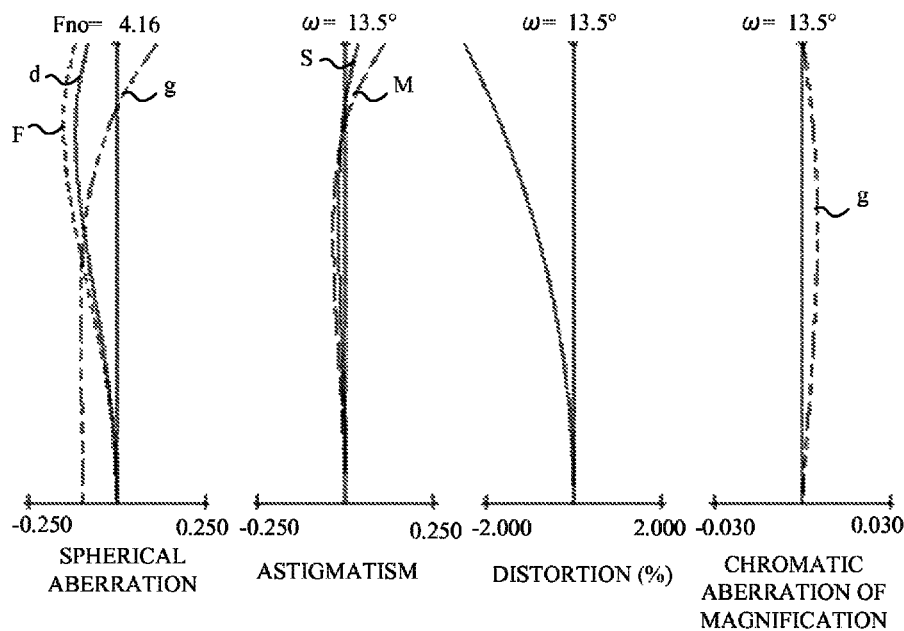
FIGS. 6A and 6B are aberration charts of the zoom lens of Embodiment 3 at the wide angle end and at a telephoto end.
Figure 6B:
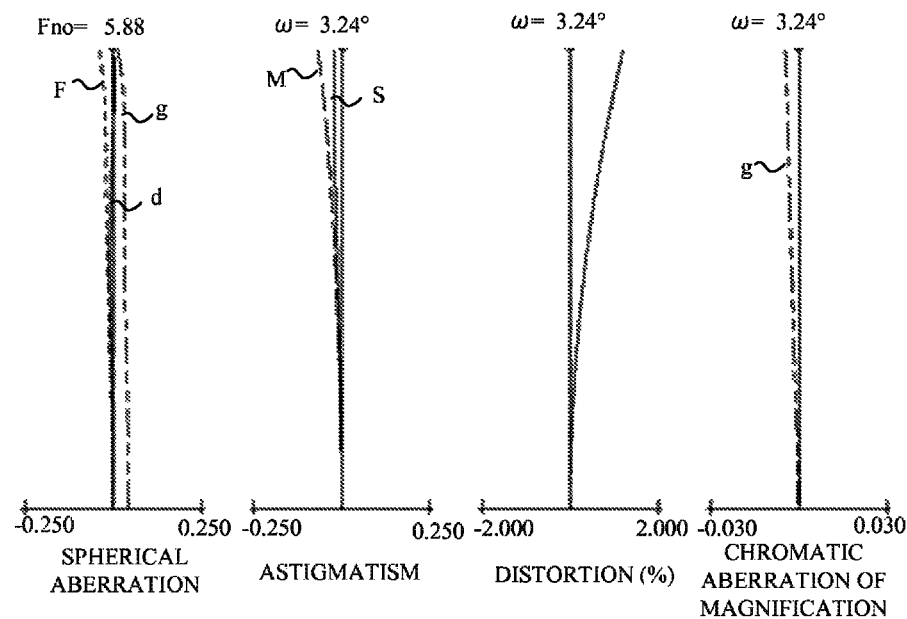
Figure 7:
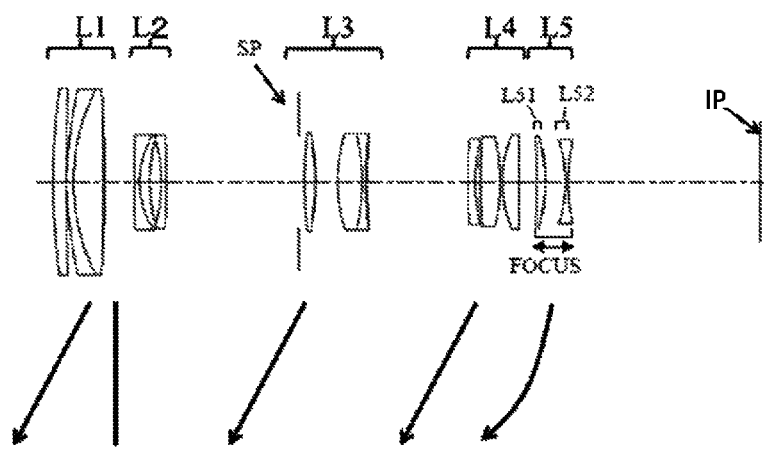
FIG. 7 is a sectional view illustrating a zoom lens that is Embodiment 4 of the present invention at a wide-angle end.
Figure 8A:
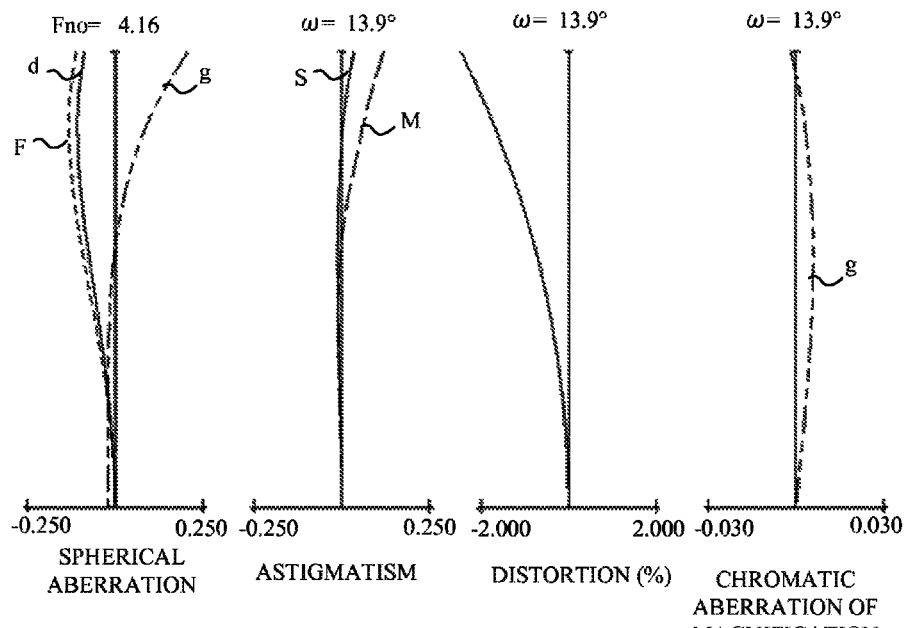
FIGS. 8A and 8B are aberration charts of the zoom lens of Embodiment 4 at the wide angle end and at a telephoto end.
Figure 8B:
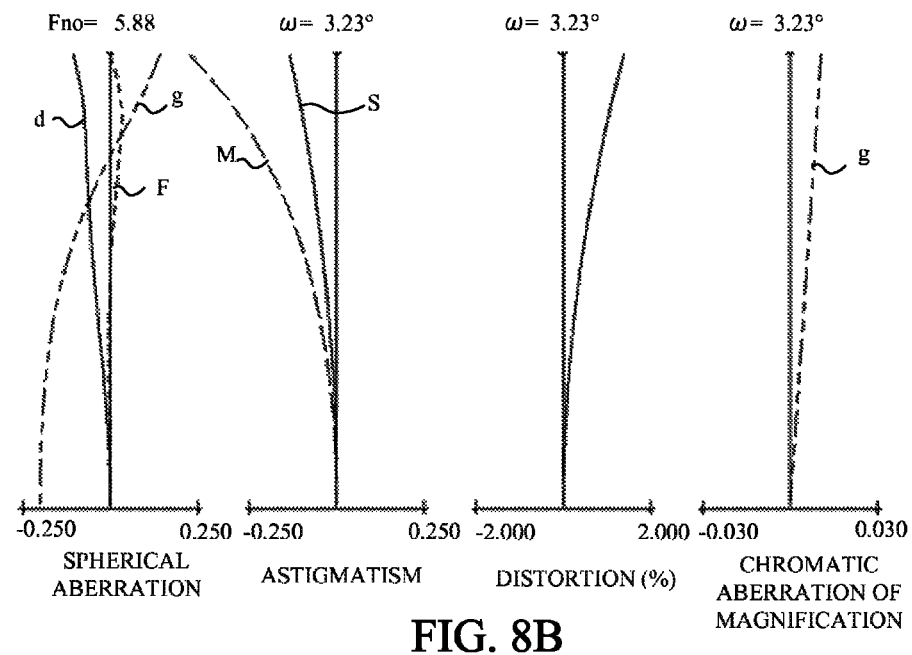

FIG. 1 shows a sectional view illustrating a zoom lens that is a first embodiment (Embodiment 1) at a wide-angle end (that is, at a shortest focal length end). FIGS. 2A and 2B are aberration charts of the zoom lens of Embodiment 1 at the wide-angle end and at a telephoto end (that is, at a longest focal length end). FIG. 3 shows a sectional view illustrating a zoom lens that is a second embodiment (Embodiment 2) at a wide-angle end. FIGS. 4A and 4B are aberration charts of the zoom lens of Embodiment 2 at the wide-angle end and at a telephoto end. FIG. 5 shows a sectional view illustrating a zoom lens that is a third embodiment (Embodiment 3) at a wide-angle end. FIGS. 6A and 6B are aberration charts of the zoom lens of Embodiment 3 at the wide-angle end and at a telephoto end. FIG. 7 shows a sectional view illustrating a zoom lens that is a fourth embodiment (Embodiment 4) at a wide-angle end. FIGS. 8A and 8B are aberration charts of the zoom lens of Embodiment 4 at the wide-angle end and at a telephoto end.

In each sectional view of the zoom lens, a left side corresponds to a subject side (object side), and a right side corresponds to an image side, in other words. In each sectional view of the zoom lens of each embodiment, reference character L1 denotes the first lens unit having a positive refractive power, reference character L2 denotes a second lens unit having a negative refractive power, reference character L3 denotes the third lens unit having a positive refractive power, reference character L4 denotes the fourth lens unit having a positive refractive power, and reference character L5 denotes the fifth lens unit having a negative refractive power. In each of Embodiments 1 to 3, reference character L6 denotes a sixth lens unit having a positive refractive power. In each sectional view of the zoom lens of each embodiment, reference character SP denotes an aperture stop.

Furthermore, reference character IP denotes an image plane at which an solid-state image sensor (photoelectric conversion element) is disposed in a case where the zoom lens is used as an image capturing optical system of a video camera or a digital still camera or a film surface is disposed in a case where de zoom lens is used as an image capturing optical system of a silver-halide film camera. In the aberration charts, spherical aberrations are shown for a d-line (wavelength: 587.56 nm), and a g-line (wavelength: 435.8 nm) and an F-line (wavelength: 486.1 nm) are shown. In the chart of astigmatism, M denotes a meridional image plane, and S denotes a sagittal image plane. The chart of distortion shows distortion for the d-line. The chart of chromatic aberration of magnification shows chromatic aberration of magnification for the g-line.

Furthermore, in the aberration charts, ω denotes a half angle of view (a half value of an image capturing angle of view), and Fno denotes an F-number. In addition, in each embodiment described later, the wide-angle end and the telephoto end correspond to zoom positions when a magnification-varying lens unit is located at both ends of a mechanically movable range on an optical axis. In each embodiment, arrows show movement loci during zooming between the wide-angle end and the telephoto end and focusing.

The zoom lens of each embodiment includes, as described, above, in order from the object side to the image side, the first lens unit L1 having a positive refractive power, the second lens unit L2 having a negative refractive power, the Third lens unit L3 having a positive refractive power, the fourth lens unit L4 having a positive refractive power, and the fifth lens unit L5 having a negative refractive power. In Embodiments 1 to 3, the zoom lens includes the sixth lens unit L6 having a positive refractive power on the image side further than the fifth lens unit L5.

During focusing on from an infinite object to a close distance object, the fifth lens unit L5 is moved to the image side. In addition, in order to suppress aberration variation during focusing, the fifth lens unit L5 is constituted as follows. The fifth lens unit L5 is divided into a positive lens unit (hereinafter referred to as "a 5-1st lens unit") L51 having a positive refractive power and a negative lens unit (hereinafter referred to as "a 5-2nd lens unit") L52 having a negative refractive power in order from the object side to the image side; the 5-1st and 5-2nd negative lens unit L52 are divided by an aerial gap with a largest aerial distance L5a therebetween in the fifth lens unit L5 in the fifth lens unit L5, disposing the 5-1st lens unit L51 having a weak refractive power on the object side where an incident height of an axial light flux is high and disposing the 5-2nd lens unit L52 having a strong refractive power on the image side on the image side further than the 5-1st lens unit where the incident height of the axial light flux is low enables sufficient correction of the aberration variation, particularly, variations of spherical aberration and coma aberration during focusing, with a small number of lenses. Such a configuration of the fifth lens unit L5 makes it possible to reduce weight of the fifth lens unit L5 and to provide a high optical performance in an entire object distance range.

In order to reduce the weight of the fifth lens unit L5 and the aberration variation during focusing, it is desirable to provide optical powers (the optical power is an inverse of a focal length) to the fourth lens unit L4 and the third lens unit L3 as equally as possible. Specifically, it is desirable to satisfy the following condition where f3 and f4 respectively represent a focal length of the third lens unit L3 and a focal length of the fourth lens unit L4:

$$0.7 < f3/f4 < 1.5. \quad (1)$$

Condition (1) limits a ratio of the focal length of the third lens unit L3 to the focal length of the fourth lens unit L4. A strong refractive power of the fourth lens unit L4 making the ratio higher than the upper limit, of condition (1) increases the aberration variation during focusing. On the other hand, a weak refractive power of the fourth lens unit L4 making the ratio lower than the lower limit of condition (1) makes it difficult to reduce the weight of the fifth lens unit L5. It is more desirable to set the numerical range of condition (1) as follows:

$$0.8 < f3/f4 < 1.1. \quad (1a)$$

In each embodiment, it is desirable to satisfy one or more of the following conditions where f1 represents a focal length of the first lens unit L1, f2 represents a focal length of the second lens unit L2, f5 represents a focal length of the fifth lens unit L5, and fw represents a focal length of the entire zoom lens at the wide-angle end. Moreover, L5a represents the largest aerial distance in the fifth lens unit L5, and f52 represents a focal length of the 5-2nd lens unit of the fifth lens unit.

$$2.0 < f1/fw < 2.8 \quad (2)$$

$$0.35 < |f2/fw| < 0.65 \quad (3)$$

$$0.6 < |f5/fw| < 1.0 \quad (4)$$

$$5.0 < |f52/L5a| < 11.5 \quad (5)$$

Next, technical meanings of the above-described conditions will be described.

Condition (2) limits the focal length of the first lens unit L1. Many telephoto-type zoom lenses generate aberrations in the first lens unit L1 and the second lens unit L2. Therefore, the zoom lens of each embodiment allocates a magnification-varying effect of the first lens unit L1 to the second lens unit L2 and the third lens unit L3 to achieve a high optical performance.

A weak refractive tower of the first lens unit L1 making the value of f1/fw higher than the upper limit of condition (2), increases a forward movement amount of the first lens unit L1 for acquisition of a desired zoom ratio, which increases a size of the entire zoom lens. A strong refractive power of the first lens unit L1 making the value of f1/fw lower than the lower limit of condition (2) makes it difficult to achieve a high optical performance because of increase of variation of field curvature during zooming and the like. It is more desirable to set the numerical range of condition (2) as follows:

$$2.1 < f1/fw < 2.5. \tag{2a}$$

The zoom lens of each embodiment has an image stabilizing function (image blur correcting function) that moves the second lens unit (image stabilizing lens unit) L2 in a direction including a directional component orthogonal to the optical axis so as to move an object image as an optical image formed by the zoom lens in a direction orthogonal to the optical axis. Although increase of a refractive power of the image stabilizing lens unit reduces a movement amount during image stabilization and thereby reduces the size of the entire zoom lens, it makes difficult to achieve a high optical performance. Therefore, it is necessary to appropriately set the refractive power of the image stabilizing lens unit.

Condition (3) limits the focal length of the second lens unit L2. A weak refractive power of the second lens unit L2 making the value of |f2/fw| higher than the upper limit of condition (3) increases the movement amount of the second lens unit L2 during image stabilization, which makes it difficult to reduce the size of the entire zoom lens. On the other hand, a strong refractive power of the second lens unit L2 making the value of |f2/fw| lower than the lower limit of condition (3) deteriorates optical performance during image stabilization it is more desirable to set the numerical range of condition (3) as follows:

$$0.40 < |f2/fw| < 0.55. \tag{3a}$$

In order to reduce the weight of the fifth lens unit L5 as a focus lens unit, it is necessary to constitute the fifth lens unit L5 by a small number of lenses.

On the other hand, in order to reduce the size of the fifth lens unit, it is necessary to increase the refractive power of the fifth lens unit L5 to some extent so as to reduce a movement amount of the fifth lens unit L5 during focusing. Therefore, it is important to appropriately set the refractive power of the fifth lens unit L5.

Condition (4) limits the focal length of the fifth lens unit L5 as the focus lens unit. A weal refractive power of the fifth lens unit. L5 making the value of |f5/fw| higher than the upper limit of condition (4) increases the movement amount of the fifth lens unit L5 during focusing, which increases the size of the entire zoom lens. On the other hand, a strong refractive power of the fifth lens unit L5 making the value of |f5/fw| lower than the lower limit of condition (4) increases the aberration variation during focusing. It is more desirable to set the numerical range of condition (4) as follows:

$$0.60 < |f5/fw| < 0.93. \tag{4a}$$

In general, in a rear-focus telephoto zoom lens, a movement amount of a focus lens unit is large, which increases aberration variation, particularly, variation of chromatic aberration during focusing. In order to achieve a high optical performance, it is desirable that the focus lens unit have a positive lens unit and a negative lens unit. Since the fifth lens unit has the negative refractive power, the refractive power of the 5-1st lens unit as the positive lens unit is weak and the refractive power of the 5-2nd lens unit as the negative lens unit is strong.

Thus, in each embodiment, the 5-1st lens unit L51 having the positive refractive power is disposed on the object side where the incident height of the axial light flux is high and the 5-2nd lens unit L52 having the negative refractive power is disposed on the image side where the incident height of the axial light flux is low. Thereby, it becomes easy to efficiently correct the spherical aberration or the like during focusing. In addition, utilizing an aerial lens formed between the 5-1st lens unit L51 and the 5-2nd lens unit L52 sufficiently corrects the coma aberration or the like.

Condition (5) limits refractive power arrangement of the 5-1st lens unit and the 5-2nd lens unit divided by the aerial gap having the largest aerial distance L5a in the fifth lens unit L5. A weak negative refractive power of the 5-2nd lens unit L52 making the value of |f52/L5a| higher than the upper limit of condition (5) increases a movement amount of the fifth lens unit L5 during focusing, which makes it difficult to reduce the size of the entire zoom lens. In addition, reduction of the aerial gap L5a increases positional sensitivity of the 5-1st and 5-2nd lens units, which makes assembly of the fifth lens unit L5 (and the zoom lens) difficult. A strong negative refractive power of the 5-2nd lens unit L52 making the value of |f52/L5a| lower than the lower limit of condition (5) makes aberration correction with a small number of lenses difficult. It is more desirable to set the numerical range of condition (5) as follows:

$$6.0 < |f52/L5a| < 11.2. \tag{5a}$$

As described above, each embodiment enables achievement of a zoom lens whose focus lens unit is compact, in which aberration variation during focusing is small and which has a high optical performance.

Next, description will be made of configurations of the zoom lenses of Embodiments 1 to 4.

The zoom lens of Embodiment 1 is a 6-lens unit zoom lens that includes, in order from the object side to the image side, the first lens unit L1 having a positive refractive power, the second lens unit L2 having a negative refractive power, the third lens unit L3 having a positive refractive power, the fourth lens unit L4 having a positive refractive power, the fifth lens unit L5 having a negative refractive power, and the sixth lens unit L6 having a positive refractive power.

The first lens unit L1 is constituted by, in order from the object side to the image side, a positive lens whose object side surface has a convex shape, and a cemented lens formed by cementing a negative meniscus lens whose object side surface has a convex shape with a positive lens whose object side surface has a convex shape. The second lens unit L2 is constituted by, in order from the object side to the image side, a cemented lens formed by cementing a negative lens whose object side surface has a concave shape with a positive meniscus lens whose object side surface has a convex shape, and a negative lens whose object side surface has a concave shape.

The third lens unit L3 is constituted by, in order from the object side to the image side, a positive lens whose object side surface has a convex shape, a cemented lens formed by cementing a positive lens whose object side surface has a convex shape and a negative lens whose object side surface has a concave shape, and an aperture stop SP. The fourth lens unit L4 is constituted by, in order from the object side to the image side, a negative lens whose image side surface has a concave shape, a positive lens whose object side surface has a convex shape, and a positive lens whose object side surface has a convex shape.

The fifth lens unit L5 configured to include, in the order from the object side to the image side, a positive meniscus lens whose object side surface has a concave shape, and a negative lens whose object side surface has a concave shape. The fifth lens unit L5 is moved during focusing on from an infinite object to a close distance object. The sixth lens unit L6 is constituted by a positive lens whose object side surface has a convex shape. During zooming from the wide-angle end to the telephoto end, the first lens unit L1, the third lens unit L3, the fourth lens unit L4 and the fifth lens unit L5 are move to the object side, and the second lens unit L2 and the sixth lens unit L6 are not moved.

The zoom lens of Embodiment 2 is a 6-lens unit zoom lens that includes six lens units. The refractive powers of the first to sixth lens units L1 to L6 and the movement condition of the first, third, fourth and fifth lens units L1, L3, L4 and L5 during zooming are same as those in Embodiment 1. In addition, the movement condition of the fifth lens unit L5 during focusing is also same as that in Embodiment 1 Furthermore, configurations of the respective lens units L1 to L6 are same as those in Embodiment 1.

The zoom lens of Embodiment 3 is a 6-lens unit zoom lens that includes six lens units. The refractive powers of the first to sixth lens units L1 to L6 are same as those in Embodiment 1. During the zooming from the wide-angle end to the telephoto end, the first lens unit L1, the third lens unit 13, the fourth lens unit L4, the fifth lens unit L5 and the sixth lens unit L6 are moved to the object side, and the second lens unit L2 is not moved. During focusing, the fifth lens unit L5 is moved as well as in Embodiment 1. Configurations of the respective lens units L1 to L6 are same as those in Embodiment 1.

The zoom lens of Embodiment 4 is a 5-lens unit zoom lens that includes, in order from the object side to the image side, the first lens unit L1 having a Positive refractive power, the second lens unit L2 having a negative refractive power, the third lens unit L3 having a positive refractive power, the fourth lens unit L4 having a positive refractive power and the fifth lens unit L5 having a negative refractive power. During zooming from the wide-angle end to the telephoto end, the first lens unit L1, the third lens unit L3, the fourth lens unit L4 and the fifth lens unit L5 are moved to the object side, and the second lens unit L2 is not moved. During focusing, the fifth lens unit L5 is moved as well as in Embodiment 1. Configurations of the respective lens units L1 to L5 are same as those in Embodiment 1.

Next, an embodiment of an image pickup apparatus provided with the zoom lens that is any one of Embodiments 1 to 4 will be described with reference to FIG. 9. The image pickup apparatus, for example, a single-lens reflex camera is provided with an interchangeable lens including the zoom lens and a camera body to which the interchangeable lens is detachably attached via a camera mount. The camera body includes an image sensor receiving an optical image formed by the zoom lens and photoelectrically converting the optical image to output an electric signal.

Figure 9:
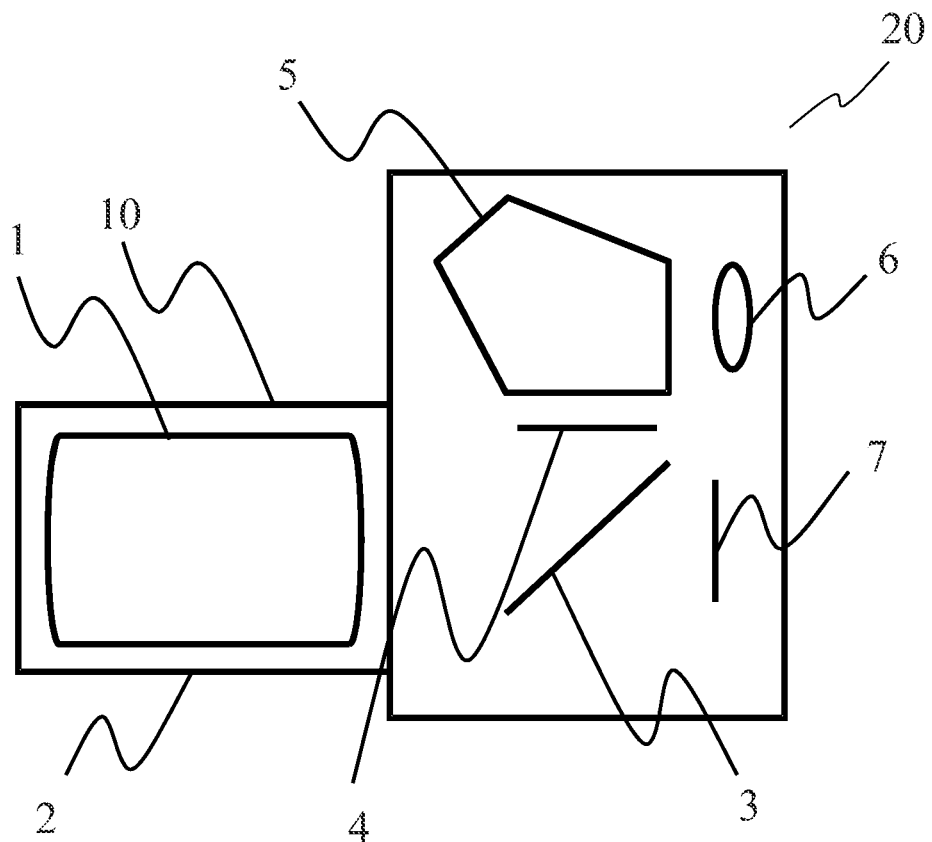
FIG. 9 schematically shows a digital camera provided with the zoom lens that is any one of Embodiments 1 to 4.

FIG. 9 schematically shows a configuration of the single-lens reflex camera. In FIG. 9, reference numeral 10 denotes the interchangeable lens including the zoom lens 1. The zoom lens 1 is held by a lens barrel 2 as a holding member. Reference numeral 20 denotes the camera body including a quick return mirror 3 reflecting a light flux from the interchangeable lens 10 upward and a focusing screen 4 disposed at an imaging position of the interchangeable lens 10. In addition, the camera body 20 includes a penta dach prism 5 to convert an inverted image formed on the focusing screen 4 into an erected image, an eyepiece lens 6 to allow a user to observe the erected image, and others.

Reference numeral 7 denotes the image sensor (photoelectric conversion element) such as a CCD sensor or a CMOS sensor, which photoelectrically converts the optical image formed by the interchangeable lens 10. When image capturing is performed, the quick return mirror 3 is moved out from an optical path from the interchangeable lens 10, and the optical image is formed on the image sensor 7 by the light flux from the interchangeable lens 10. The zoom lenses of Embodiments 1 to 4 can be applied to a mirror-less digital camera having no quick return mirror.

Next, specific numerical values (lens data) of Numerical Examples 1 to 4 respectively corresponding to Embodiments 1 to 4 are shown. In each numerical example, i represents an ordinal number of surfaces or lenses counted from the object side, ri (i=1, 2, 3, . . . ) represents a curvature radius of an i-th lens surface, and di represents a thickness or an aerial distance between the i-th lens surface and an (i+1)-th lens surface. Moreover, ndi and vdi respectively represent a refractive index and an Abbe number of a material of an i-th lens for the d-line. BF represents a back focus. Calculation results of conditions (1) to (5) based on the lens data of Numerical Examples 1 to 4 are listed in Table 1.

Numerical Example 1

| Unit mm | | | | |
|---|---|---|---|---|
| Surface Data | | | | |
| Surface No. | r | d | nd | vd | Effective Diameter |
|---|---|---|---|---|---|
| 1 | 75.822 | 4.04 | 1.48749 | 70.2 | 41.07 |
| 2 | −1012.039 | 0.15 | | | 40.88 |
| 3 | 103.585 | 1.50 | 1.65412 | 39.7 | 40.20 |
| 4 | 40.402 | 6.21 | 1.48749 | 70.2 | 38.71 |
| 5 | 309.896 | (Variable) | | | 38.24 |
| 6 | −175.936 | 1.00 | 1.72916 | 54.7 | 20.06 |
| 7 | 21.469 | 3.11 | 1.84666 | 23.8 | 19.57 |
| 8 | 56.355 | 1.83 | | | 19.28 |
| 9 | −46.811 | 1.00 | 1.80400 | 46.6 | 19.28 |
| 10 | 301.065 | (Variable) | | | 19.61 |
| 11 | 60.758 | 3.11 | 1.61800 | 63.3 | 21.08 |
| 12 | −57.019 | 7.14 | | | 21.17 |
| 13 | 32.897 | 4.48 | 1.51633 | 64.1 | 20.09 |
| 14 | −37.170 | 1.00 | 1.90366 | 31.3 | 19.63 |
| 15 | 151.138 | 2.00 | | | 19.34 |
| 16(SP) | ∞ | (Variable) | | | 19.17 |
| 17 | −2306.862 | 1.00 | 1.74950 | 35.3 | 17.77 |
| 18 | 37.719 | 0.83 | | | 17.67 |
| 19 | 82.429 | 2.64 | 1.60311 | 60.6 | 17.74 |
| 20 | −39.842 | 0.10 | | | 17.84 |
| 21 | 25.327 | 2.34 | 1.54072 | 47.2 | 17.47 |
| 22 | 87.278 | (Variable) | | | 17.06 |
| 23 | −48.163 | 1.33 | 1.80518 | 25.4 | 15.36 |
| 24 | −31.164 | 4.85 | | | 15.28 |
| 25 | −26.539 | 0.70 | 1.51823 | 58.9 | 14.13 |
| 26 | 40.439 | (Variable) | | | 14.39 |
| 27 | 44.282 | 1.55 | 1.68893 | 31.1 | 21.45 |
| 28 | 59.437 | 37.49 | | | 21.38 |
| IP | ∞ | | | | |

| Various Data | | | |
|---|---|---|---|
| Zoom Ratio 4.27 | | | |
| | WIDE | MIDDLE | TELE |
| Focal Length | 56.58 | 134.04 | 241.47 |
| F-number | 4.15 | 5.15 | 5.88 |
| Half Angle of View | 13.57 | 5.82 | 3.24 |
| Image Height | 13.66 | 13.66 | 13.66 |
| Entire Lens Length | 154.69 | 186.00 | 205.69 |
| BF | 37.49 | 37.49 | 37.49 |
| d5 | 7.00 | 38.31 | 58.00 |
| d10 | 29.92 | 12.19 | 1.00 |
| d16 | 21.90 | 14.16 | 17.23 |
| d22 | 2.00 | 5.04 | 4.00 |

-continued

Unit mm

| d26 | 4.47 | 26.90 | 36.06 |
|---|---|---|---|

Lens Unit Data

| Unit | Starting Surface | Focal Length | Unit Length | Front Principal Point | Rear Principal Point |
|---|---|---|---|---|---|
| 1 | 1 | 130.95 | 11.90 | −1.12 | −8.95 |
| 2 | 6 | −29.35 | 6.94 | 3.36 | −1.25 |
| 3 | 11 | 45.59 | 17.73 | −1.33 | −14.85 |
| 4 | 17 | 52.88 | 6.90 | 4.48 | −0.02 |
| 5 | 23 | −45.71 | 6.88 | 7.54 | 1.33 |
| 6 | 27 | 241.99 | 1.55 | −2.57 | −3.45 |

Numerical Example 2

Unit mm

Surface Data

| Surface No. | r | d | nd | vd | Effective Diameter |
|---|---|---|---|---|---|
| 1 | 82.406 | 3.78 | 1.48749 | 70.2 | 41.07 |
| 2 | −1441.511 | 0.15 | | | 40.90 |
| 3 | 102.085 | 1.50 | 1.65412 | 39.7 | 40.29 |
| 4 | 43.821 | 5.16 | 1.49700 | 81.5 | 38.99 |
| 5 | 434.728 | (Variable) | | | 38.73 |
| 6 | −390.425 | 1.00 | 1.72916 | 54.7 | 19.93 |
| 7 | 20.102 | 3.19 | 1.84666 | 23.8 | 19.31 |
| 8 | 48.621 | 1.97 | | | 18.93 |
| 9 | −44.138 | 1.00 | 1.80400 | 46.6 | 18.93 |
| 10 | 243.626 | (Variable) | | | 19.26 |
| 11 | 59.668 | 3.09 | 1.72916 | 54.7 | 20.95 |
| 12 | −57.807 | 5.02 | | | 20.98 |
| 13 | 31.185 | 3.91 | 1.48749 | 70.2 | 19.21 |
| 14 | −37.629 | 1.00 | 1.90366 | 31.3 | 18.78 |
| 15 | 107.506 | 5.12 | | | 18.42 |
| 16(SP) | ∞ | (Variable) | | | 17.90 |
| 17 | −402.067 | 1.00 | 1.74950 | 35.3 | 16.70 |
| 18 | 38.772 | 0.67 | | | 16.61 |
| 19 | 87.555 | 3.70 | 1.60311 | 60.6 | 16.65 |
| 20 | −36.374 | 1.47 | | | 16.85 |
| 21 | 25.406 | 2.22 | 1.54072 | 47.2 | 16.27 |
| 22 | 89.105 | (Variable) | | | 15.86 |
| 23 | −42.175 | 1.30 | 1.80518 | 25.4 | 14.28 |
| 24 | −29.178 | 4.27 | | | 14.45 |
| 25 | −26.375 | 0.70 | 1.51823 | 58.9 | 14.05 |
| 26 | 40.439 | (Variable) | | | 14.34 |
| 27 | 80.255 | 1.66 | 1.68893 | 31.1 | 21.81 |
| 28 | 210.811 | | | | 21.86 |
| IP | ∞ | | | | |

Various Data
Zoom Ratio 4.27

| | WIDE | MIDDLE | TELE |
|---|---|---|---|
| Focal Length | 56.53 | 133.00 | 241.49 |
| F-number | 4.16 | 5.15 | 5.88 |
| Half Angle of View | 13.58 | 5.86 | 3.24 |
| Image Height | 13.66 | 13.66 | 13.66 |
| Entire Lens Length | 150.33 | 182.33 | 200.33 |
| BF | 37.00 | 37.00 | 37.00 |
| d5 | 7.00 | 39.00 | 57.00 |
| d10 | 28.48 | 12.29 | 1.00 |
| d16 | 18.20 | 10.96 | 12.42 |
| d22 | 2.00 | 4.77 | 3.67 |
| d26 | 4.77 | 25.43 | 36.36 |

Lens Unit Data

| Unit | Starting Surface | Focal Length | Unit Length | Front Principal Point | Rear Principal Point |
|---|---|---|---|---|---|
| 1 | 1 | 125.15 | 10.59 | −0.34 | −7.34 |
| 2 | 6 | −28.29 | 7.15 | 3.73 | −1.08 |
| 3 | 11 | 42.82 | 18.15 | −2.23 | −16.27 |
| 4 | 17 | 51.94 | 9.06 | 6.46 | 0.35 |
| 5 | 23 | −43.75 | 6.27 | 6.37 | 0.85 |
| 6 | 27 | 187.13 | 1.66 | −0.60 | −1.58 |

Numerical Example 3

Unit mm

Surface Data

| Surface No. | r | d | nd | vd | Effective Diameter |
|---|---|---|---|---|---|
| 1 | 70.708 | 4.54 | 1.48749 | 70.2 | 41.04 |
| 2 | ∞ | 0.15 | | | 40.75 |
| 3 | 96.801 | 1.70 | 1.65412 | 39.7 | 40.08 |
| 4 | 38.081 | 6.35 | 1.48749 | 70.2 | 38.43 |
| 5 | 328.523 | (Variable) | | | 37.99 |
| 6 | −184.565 | 0.80 | 1.71300 | 53.9 | 18.20 |
| 7 | 19.233 | 2.61 | 1.80809 | 22.8 | 17.72 |
| 8 | 43.170 | 2.06 | | | 17.46 |
| 9 | −40.963 | 0.80 | 1.80400 | 46.6 | 17.46 |
| 10 | 66857.597 | (Variable) | | | 17.78 |
| 11 | 156.448 | 2.88 | 1.80400 | 46.6 | 20.73 |
| 12 | −53.274 | 2.84 | | | 20.91 |
| 13 | 30.717 | 5.21 | 1.49700 | 81.5 | 20.38 |
| 14 | −48.144 | 1.12 | 1.90366 | 31.3 | 19.66 |
| 15 | 127.403 | 2.65 | | | 19.32 |
| 16(SP) | ∞ | (Variable) | | | 19.04 |
| 17 | −85.617 | 1.00 | 1.80610 | 33.3 | 17.11 |
| 18 | 39.709 | 0.36 | | | 17.22 |
| 19 | 57.007 | 3.21 | 1.72916 | 54.7 | 17.25 |
| 20 | −41.442 | 0.10 | | | 17.46 |
| 21 | 28.396 | 3.21 | 1.65844 | 50.9 | 17.24 |
| 22 | 267.012 | (Variable) | | | 16.62 |
| 23 | −115.808 | 1.56 | 1.76182 | 26.5 | 15.22 |
| 24 | −39.330 | 2.16 | | | 15.20 |
| 25 | −39.123 | 0.70 | 1.69680 | 55.5 | 14.42 |
| 26 | 28.866 | (Variable) | | | 14.32 |
| 27 | 46.017 | 2.60 | 1.54072 | 47.2 | 18.32 |
| 28 | 131.738 | (Variable) | | | 18.40 |
| IP | ∞ | | | | |

Various Data
Zoom Ratio 4.25

| | WIDE | Middle 1 | Middle 2 |
|---|---|---|---|
| Focal Length | 56.80 | 135.16 | 241.32 |
| F-number | 4.16 | 5.18 | 5.88 |
| Half Angle of View | 13.52 | 5.77 | 3.24 |
| Image Height | 13.66 | 13.66 | 13.66 |
| Entire Lens Length | 153.89 | 191.28 | 208.89 |
| BF | 38.57 | 57.95 | 65.38 |
| d5 | 5.87 | 43.27 | 60.87 |
| d10 | 24.92 | 11.82 | 1.50 |
| d16 | 19.96 | 13.68 | 16.56 |
| d22 | 4.10 | 3.40 | 2.05 |
| d26 | 11.86 | 12.56 | 13.91 |
| d28 | 38.57 | 57.95 | 65.38 |

| | Middle 3 | Middle 4 | TELE |
|---|---|---|---|
| Focal Length | 74.27 | 203.01 | 57.92 |
| F-number | 4.44 | 5.58 | 4.18 |
| Half Angle of View | 10.42 | 3.85 | 0.00 |

-continued

| Unit mm | | | |
|---|---|---|---|
| Image Height | 13.66 | 13.66 | 0.00 |
| Entire Lens Length | 167.12 | 204.31 | 154.99 |
| BF | 45.28 | 63.56 | 39.06 |
| d5 | 19.11 | 56.30 | 6.97 |
| d10 | 20.90 | 4.95 | 24.67 |
| d16 | 17.26 | 14.94 | 19.72 |
| d22 | 3.85 | 2.60 | 4.06 |
| d26 | 12.11 | 13.36 | 11.90 |
| d28 | 45.28 | 63.56 | 39.06 |

Lens Unit Data

| Unit | Starting Surface | Focal Length | Unit Length | Front Principal Point | Rear Principal Point |
|---|---|---|---|---|---|
| 1 | 1 | 126.40 | 12.74 | −1.18 | −9.55 |
| 2 | 6 | −26.32 | 6.27 | 2.97 | −1.41 |
| 3 | 11 | 44.00 | 14.70 | −1.15 | −11.65 |
| 4 | 17 | 42.70 | 7.88 | 4.46 | −0.13 |
| 5 | 23 | −35.50 | 4.42 | 4.23 | 0.72 |
| 6 | 27 | 129.41 | 2.60 | −0.90 | −2.57 |

Numerical Example 4

| Unit mm | | | | | |
|---|---|---|---|---|---|
| Surface Data | | | | | |
| Surface No. | r | d | nd | vd | Effective Diameter |
| 1 | 145.876 | 3.06 | 1.48749 | 70.2 | 41.16 |
| 2 | 526.599 | 0.15 | | | 40.97 |
| 3 | 91.482 | 1.50 | 1.59271 | 35.3 | 40.76 |
| 4 | 46.566 | 6.92 | 1.49700 | 81.5 | 39.91 |
| 5 | −457.579 | (Variable) | | | 39.53 |
| 6 | 1220.841 | 1.00 | 1.71659 | 55.5 | 20.35 |
| 7 | 19.681 | 2.43 | 1.80809 | 22.8 | 19.64 |
| 8 | 39.998 | 2.51 | | | 19.40 |
| 9 | −36.479 | 1.20 | 1.78879 | 47.6 | 19.40 |
| 10 | −257.070 | (Variable) | | | 19.91 |
| 11(SP) | ∞ | 1.26 | | | 20.66 |
| 12 | 99.885 | 2.41 | 1.73600 | 48.7 | 21.19 |
| 13 | −67.545 | 5.00 | | | 21.26 |
| 14 | 34.882 | 5.68 | 1.49700 | 81.5 | 20.58 |
| 15 | −44.225 | 1.00 | 1.90366 | 31.3 | 19.86 |
| 16 | 179.893 | (Variable) | | | 19.65 |
| 17 | 309.116 | 1.50 | 1.84586 | 24.5 | 18.34 |
| 18 | 39.894 | 1.15 | | | 18.18 |
| 19 | 105.376 | 4.55 | 1.51726 | 52.5 | 18.32 |
| 20 | −40.778 | 0.50 | | | 19.23 |
| 21 | 28.874 | 3.82 | 1.57108 | 39.0 | 20.22 |
| 22 | 4114.716 | (Variable) | | | 20.03 |
| 23 | −140.662 | 1.81 | 1.66336 | 31.1 | 19.48 |
| 24 | −41.765 | 4.55 | | | 19.45 |
| 25 | −33.416 | 0.70 | 1.62449 | 62.8 | 17.69 |
| 26 | 44.523 | (Variable) | | | 17.64 |
| IP | ∞ | | | | |

Various Data
Zoom Ratio 4.40

| | WIDE | MIDDLE | TELE |
|---|---|---|---|
| Focal Length | 55.00 | 137.00 | 242.00 |
| F-number | 4.16 | 5.75 | 5.88 |
| Half Angle of View | 13.95 | 5.69 | 3.23 |
| Image Height | 13.66 | 13.66 | 13.66 |
| Entire Lens Length | 160.37 | 187.35 | 211.37 |
| BF | 43.47 | 67.04 | 78.61 |
| d5 | 7.00 | 33.98 | 58.00 |
| d10 | 30.11 | 8.11 | 1.00 |
| d16 | 23.11 | 17.74 | 19.07 |
| d22 | 4.00 | 7.80 | 2.00 |
| d26 | 43.47 | 67.04 | 78.61 |
| Entrance pupil Position | 44.18 | 86.34 | 56.98 |
| Exit Pupil Position | −41.57 | −36.52 | −37.51 |
| Front Principal Point | 63.61 | 42.10 | −105.34 |
| Rear Principal Point | −11.53 | −69.96 | −163.39 |

Lens Unit Data

| Unit | Starting Surface | Focal Length | Unit Length | Front Principal Point | Rear Principal Point |
|---|---|---|---|---|---|
| 1 | 1 | 127.13 | 11.63 | 1.82 | −5.99 |
| 2 | 6 | −29.54 | 7.14 | 3.48 | −1.61 |
| 3 | 11 | 50.22 | 15.35 | −0.53 | −11.60 |
| 4 | 17 | 48.01 | 11.52 | 7.84 | 0.40 |
| 5 | 23 | −50.00 | 7.06 | 8.56 | 2.16 |

Single lens data

| Lens | Starting Surface | Focal Length |
|---|---|---|
| 1 | 1 | 412.80 |
| 2 | 3 | −162.03 |
| 3 | 4 | 85.43 |
| 4 | 6 | −27.92 |
| 5 | 7 | 45.51 |
| 6 | 9 | −54.02 |
| 7 | 12 | 55.09 |
| 8 | 14 | 40.20 |
| 9 | 15 | −39.20 |
| 10 | 17 | −54.29 |
| 11 | 19 | 57.45 |
| 12 | 21 | 50.90 |
| 13 | 23 | 88.90 |
| 14 | 25 | −30.46 |

TABLE 1

| Numerical Example | Condition | | | | |
|---|---|---|---|---|---|
| | (1) | (2) | (3) | (4) | (5) |
| 1 | 0.86 | 2.31 | 0.52 | 0.81 | 6.4 |
| 2 | 0.82 | 2.21 | 0.50 | 0.77 | 7.2 |
| 3 | 1.03 | 2.23 | 0.46 | 0.63 | 11.0 |
| 4 | 1.05 | 2.31 | 0.54 | 0.91 | 6.7 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-259491, filed Nov. 28, 2012, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power;
   a fourth lens unit having a positive refractive power; and
   a fifth lens unit having a negative refractive power,
   wherein:
   during zooming, the second lens unit is not moved and the first, third and fifth lens units are moved;

a distance between the first and second lens units at a telephoto end is larger than that at a wide-angle end;

a distance between the second and third lens units at the telephoto end is smaller than that at the wide-angle end;

the fifth lens unit includes, in order from the object side to the image side, a positive lens sub-unit and a negative lens sub-unit which have a largest distance therebetween in the fifth lens unit;

during focusing from an infinite object to a close distance object, the fifth lens unit is moved to the image side; and the following condition is satisfied:

$$0.7 < f3/f4 < 1.5$$

where f3 represents a focal length of the third lens unit, and f4 represents a focal length of the fourth lens unit.

2. A zoom lens according to claim 1, wherein the following condition is satisfied:

$$2.0 < f1/fw < 2.8$$

where f1 represents a focal length of the first lens unit, and fw represents a focal length of the zoom lens at the wide-angle end.

3. A zoom lens according to claim 1, wherein:

the second lens unit is moved in a direction including a directional component orthogonal to an optical axis so as to move an object image formed by the zoom lens in a direction orthogonal to the optical axis; and the following condition is satisfied:

$$0.35 < |f2/fw| < 0.65$$

where f2 represents a focal length of the second lens unit, and fw represents a focal length of the zoom lens at the wide-angle end.

4. A zoom lens according to claim 1, wherein the following condition is satisfied:

$$0.6 < |f5/fw| < 1.0$$

where f5 represents a focal length of the fifth lens unit, and fw represents a focal length of the zoom lens at the wide-angle end.

5. A zoom lens according to claim 1, wherein the following condition is satisfied:

$$5.0 < |f52/L5a| < 11.5$$

where L5a represents the largest distance in the fifth lens unit, and f52 represents a focal length of the negative lens sub-unit of the fifth lens unit.

6. A zoom lens according to claim 1, wherein the fifth lens unit is constituted by two lenses.

7. A zoom lens according to claim 1, wherein, during zooming from the wide-angle end to the telephoto end, the first, third, fourth and fifth lens units are moved to the object side.

8. A zoom lens according to claim 1, further comprising a sixth lens unit disposed on the image side further than the fifth lens unit and having a positive refractive power, and wherein, during zooming from the wide-angle end to the telephoto end, the first, third, fourth, fifth and sixth lens units are moved to the object side.

9. A zoom lens according to claim 1, further comprising a sixth lens unit disposed on the image side further than the fifth lens unit and having a positive refractive power, and wherein, during zooming from the wide-angle end to the telephoto end, the first, third, fourth and fifth lens units are moved to the object side, and the sixth lens unit is not moved.

10. An image pickup apparatus comprising:

a zoom lens; and a solid-state image sensor photoelectrically converting an optical image formed by the zoom lens, wherein the zoom lens comprises in order from an object side to an image side:

a first lens unit having a positive refractive power;

a second lens unit having a negative refractive power;

a third lens unit having a positive refractive power;

a fourth lens unit having a positive refractive power; and a fifth lens unit having a negative refractive power, wherein:

during zooming, the second lens unit is not moved and the first, third and fifth lens units are moved;

a distance between the first and second lens units at a telephoto end is larger than that at a wide-angle end;

a distance between the second and third lens units at the telephoto end is smaller than that at the wide-angle end;

the fifth lens unit includes, in order from the object side to the image side, a positive lens sub-unit and a negative lens sub-unit which have a largest distance therebetween in the fifth lens unit;

during focusing from an infinite object to a close distance object, the fifth lens unit is moved to the image side; and the following condition is satisfied:

$$0.7 < f3/f4 < 1.5$$

where f3 represents a focal length of the third lens unit, and f4 represents a focal length of the fourth lens unit.

* * * * *